3,164,598
SUBSTITUTED 1,4-DIAZABICYCLO[4.3.0]NONANES
AND METHODS FOR THEIR PREPARATION
Meier E. Freed, Philadelphia, Pa., assignor to American Home Products Corporation, New York, N.Y., a corporation of Delaware
No Drawing. Filed Feb. 1, 1963, Ser. No. 255,696
7 Claims. (Cl. 260—268)

This invention relates to a new and novel class of chemical compounds which possess important therapeutic properties, and to processes for their manufacture. The invention more particularly relates to a novel class of substituted 1,4-diazabicyclononanes having varied pharmacological activity as antihistiminic, anti-cholinergic and anti-tremorine agents in mammals.

The compounds which comprise the principal product aspect of my invention may be represented by the following general formula and include the non-toxic acid addition salts thereof:

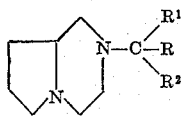

wherein R represents hydrogen and lower alkyl groups containing from 1 to 3 carbon atoms, and $R^1$ and $R^2$, which may be the same or different, are selected from a group consisting of such radicals as a cycloalkyl radical composed of up to 6 carbon atoms, and phenyl and substituted phenyl radicals. Where a substituted phenyl radical is employed the substituent is selected from the class consisting of a lower alkyl group containing from 1 to about 3 carbon atoms, a halogen atom such as chloro, bromo and fluoro and a lower alkoxy group such as methoxy.

I have found that the compounds of my invention as described above exhibit useful pharmacologic properties such as noted above. Such effects are particularly evident in the new compounds of the general formula wherein R represents hydrogen, $R^1$ represents phenyl and $R^2$ represents phenyl and/or p-chlorophenyl.

The compounds of this general formula are insoluble in aqueous media and are preferably compounded in the form of soluble non-toxic acid addition salts such as the hydrochloride, maleate, fumarate, tartrate, citrate, and the like. The compounds are preferably administered orally in tablets or elixirs in conjunction with suitable carriers and various types of excipients and diluents conventional in compounding oral pharmaceutical dosage units. Where parenteral administration is indicated the compounds in the form of non-toxic acid addition salts are prepared for administration in sterile solutions or suspensions.

The novel compounds of the invention when so contemplated for use in pharmaceutical products may be admixed and administered in combination if desired with a relatively large number of compatible diluents, carriers, and the like to form a pharmaceutical composition. Such well-known liquid carriers as mineral or vegetable oil or a non-toxic lower aliphatic alcohol may be used where the compound is to be prepared and administered as an injectable. Glycerine, for example, may be used where the compound is to be administered as a syrup. Solid excipients, binders, extenders, or such conventional carriers as carboxymethylcellulose, starches, sugars, and the like may be added where tablets or powders are to be employed as a means of oral administration. The dosage of the compounds whatever the manner in which they are administered will vary with the severity of the condition being treated and the age and weight of the subject.

The compounds of my invention may be prepared by a number of alternate methods. I prefer to employ one of the following methods of preparation, however, as illustrated by typifying reaction schemes A and B. Reaction A is as follows:

(A)
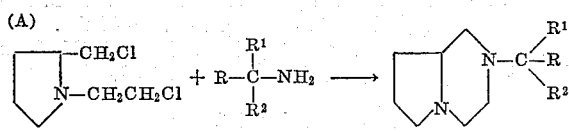

In reaction A above a known starting material such as a 1-β-chloroethyl-2-chroromethyl pyrrolidine or its acid addition salt is reacted with a selected amine such as benzhydrylamine in the presence of a solvent such as aqueous acetone or the like under reflux condition for the solvent for periods of the order of 16 hours or more. The selected amine will of course be one of those amines having the groups R, $R^1$ and $R^2$ as above defined. In the illustrative reaction depicted above, wherein R is hydrogen and $R^1$ and $R^2$ are both phenyl, the final product will be the compound 4-benzhydryl-1,4-diazabicyclo[4.3.0]nonane. Various other members of the series can be prepared in an equivalent manner by proper selection of the known substituted amine reactant. The aforementioned 4-benzhydryl compound when evaluated pharmacologically was found to exhibit marked anticholinergic activity.

In a second mode of preparation illustrated by typifying reaction scheme B, the following may be seen. In both A and B preparations the reaction may be generally described as an alkylation reaction. Alternative reaction scheme B is as follows:

(B)
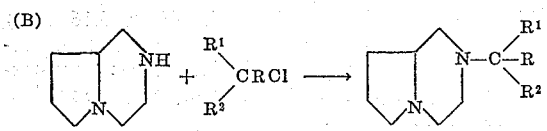

In the above reaction B the known starting material 1,4-diazabicyclo[4.3.0]nonane is alkylated by treatment with an alkyl halide such as benzhydryl chloride, 4-chlorobenzhydrylchloride and the like in the presence of a suitable inert solvent such as xylene under reflux for a relatively long reaction period of the order of 60 hours or so. The final product which is obtained if 4-chlorobenzhydrylchloride is employed as the alkylating agent is the compound 4-(4'-chlorobenzhydryl)-1,4-diazabicyclo[4.3.0]nonane, which by further reaction with a suitable inorganic or organic acid can form the salt thereof.

It may be pointed out that the compounds of my invention in addition to the uses stated may be employed in experimental pharmacology for comparison with other compounds sought to be evaluated for similar pharmacological effect.

The following several examples serve only to illustrate with particularity several embodiments of my invention. It is to be understood that for a proper definition of the legal scope of the invention attention must be directed solely to the several appended claims.

EXAMPLE 1

L(—)-4-Benzhydryl-1,4-Diazabicyclo[4.3.0]Nonane

Reflux a solution of 9 g. (0.04 mole) 1-β-chloroethyl-2-chloromethylpyrrolidine hydrochloride and 29 g. diphenylmethylamine (0.16 mole) in 100 ml. of 1:1 acetone-water for 16 hours. Boil off the acetone, cool the aqueous solution, and dilute with water (100 ml.). Make strongly basic with potassium carbonate and extract the organic layer into methylene dichloride. Wash the extract with saline, dry over sodium sulfate, filter, and vacuum distill to obtain the product boiling at 148–51°/.1 mm. Dissolve this material (2 g. of thick oil) in acetone (50 ml.) and add a solution of fumaric acid (2 g.) in 100 ml. of acetone. After allowing the solution to stand, filter off the product which crystallizes, wash with acetone, and dry. Recrystallization from isopropanol gives the mono-fumarate, M.P. 226–227°.

Analysis.—Calcd. for $C_{24}H_{28}N_2O_4$: C, 70.60; H, 6.92; N, 6.87. Found: C, 70.69; H, 6.96; N, 6.69.

EXAMPLE 2

*L(—)-4-(4'-Chlorobenzhydryl)-1,4-Diazabicyclo[4.3.0]Nonane*

Add a solution of 4-chlorobenzhydryl chloride, 5.9 g. (0.025 mole) in 35 ml. of xylene slowly to a stirred refluxing solution of 1,4-diazabicyclo[4.3.0]nonane, 3.5 g. (0.025 mole) and potassium carbonate (3 g.) in 150 ml. of xylene. Reflux the solution for 60 hours, cool, and filter. Extract the filtrate with dilute hydrochloric acid and wash the extract with ether. Make the aqueous solution basic by the addition of 40% sodium hydroxide. Extract the product into methylene dichloride, wash the extract with saline, and dry. Remove the solvent and distill the residue under vacuum. Collect the fraction boiling at 180–195°/.1 mm. Convert the base to the fumaric acid salt and purify by crystallization from methanol-acetone, M.P. 222–223°.

Analysis.—Calcd. for $C_{24}H_{27}ClN_2O_4$: C, 65.10; H, 6.15; N, 6.32; Cl, 7.96. Found: C, 65.05; H, 5.94; N, 6.44; Cl, 8.00.

EXAMPLE 3

*4-(1-Phenyl-1-Cyclohexylmethyl)-1,4-Diazabicyclo[4.3.0]Nonane*

Using phenylcyclohexylmethyl amine (30 g., 0.16 mole) and 1-β-chloroethyl-2-chloromethyl pyrrolidine hydrochloride (9 g., 0.04 mole) in 100 ml. of 1:1 acetone-water, prepare the product of this example by the method described in Example 1.

EXAMPLE 4

*4-(1-Methyl-1,1-Diphenylmethyl)-1,4 Diazabicyclo[4.3.0]Nonane*

Using 1-methyl-1,1-diphenylmethyl chloride (5.04 g., 0.025 mole) and 1,4-diazabicyclo[4.3.0]nonane (3.5 g., 0.025 mole) by the method of Example 2, the product of this example may be obtained.

EXAMPLE 5

*4-(1-Phenyl-1-o-Methylphenylmethyl)-1,4-Diazabicyclo[4.3.0]Nonane*

Using 1-o-methylphenyl-1-phenyl methyl chloride (5.04 g., 0.025 mole) and 1,4-diazabicyclo[4.3.0]nonane (3.5 g., 0.025 mole), prepare the compound of this example by the method of Example 2.

EXAMPLE 6

*4-(1-Phenyl-1-p-Methoxyphenylmethyl)-1,4-Diazabicyclo[4.3.0]Nonane*

Using 1-phenyl-p-methoxybenzylamine (4.2 g., 0.025 mole), 1-β-chloroethyl-2-chloromethyl pyrrolidine (5.6 g., 0.025 mole) and diisopropylamine (7.5 g., 0.075 mole) in 100 ml. of 1:1 acetone-water, prepare the product of this example by the method of Example 1.

I claim:
1. A compound having the formula:

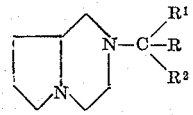

and the non-toxic acid addition salts thereof wherein R represents a substituent selected from the group consisting of hydrogen and lower alkyl; $R^1$ and $R^2$ each represent an organic radical selected from the group consisting of cycloalkyl containing up to about 6 carbon atoms, phenyl, and substituted phenyl containing as substituents therein at various positions of substitution on the phenyl ring a substituent selected from the group consisting of lower alkyl, halo, and lower alkoxy.

2. A compound according to claim 1 wherein R represents a lower alkyl group and $R^1$ and $R^2$ each represent phenyl.

3. 4 - (1 - methyl - 1,1 - diphenylmethyl) - 1,4 - diazabicyclo[4.3.0]nonane.

4. A compound according to claim 1 wherein R represents hydrogen and $R^1$ and $R^2$ each represent phenyl.

5. 4-benzhydryl-1,4-diazabicyclo[4.3.0]nonane.

6. A compound according to claim 1 wherein R represents hydrogen, $R^1$ represents phenyl and $R^2$ represents chlorophenyl.

7. 4 - (4' - chlorobenzhydryl) - 1,4 - diazabicyclo [4.3.0]nonane.

References Cited in the file of this patent
UNITED STATES PATENTS 2,999,091    Zaugg _____ Sept. 5, 1961

OTHER REFERENCES

Freed et al.: Journal Organic Chemistry, vol. 25, pp. 2108–2113 (1960).